United States Patent Office 2,777,822
Patented Jan. 15, 1957

2,777,822
SILICA-ALUMINA CRACKING CATALYST PRODUCTION

Charles P. Wilson, Jr., Cincinnati, Ohio, assignor to W. R. Grace & Co., New York, N. Y., a corporation of Connecticut No Drawing. Application April 27, 1953,
Serial No. 351,487

6 Claims. (Cl. 252—453)

This invention relates to silica-alumina catalysts and to a novel and improved method of manufacturing such catalysts.

It has long been known to use silica-alumina composites as catalysts and as carriers for various catalytic agents used in a large variety of reactions. In general, these materials are prepared by first forming a silica hydrogel, impregnating this hydrogel with a solution of aluminum salt, adding a basic precipitant to precipitate alumina in situ, washing the resulting silica-alumina composite to remove soluble constituents and drying and activating the washed composite. As thus described, the preparation of silica-alumina catalysts appears to be quite simple, but such is not the case. The procedures which are generally followed are very precise and must be meticulously followed. Experience has shown that slight variations from the established procedures can result in extreme operating difficulties or may even make the process inoperable. In addition, the material so produced may not exhibit the usual or desired catalytic activity. Accordingly, process variations have been instituted only with extreme caution.

One widely used procedure for producing silica-alumina composites is to form an alkaline silica hydrogel, age the mixture for a short period, add sufficient additional acid to reduce the pH of the mixture well below the neutral point, add a basic reagent to neutralize the acidity, add the required amount of alum solution to the mixture, and then precipitate alumina by the addition of ammonia. While it would be readily apparent that the acid and base required to effect, the downward and upward adjustments in the pH of the silica hydrogel mixture prior to the alum addition are lost because their reaction products are removed from the mixture by subsequent washing, attempts to avoid these adjustments have heretofore failed because their elimination introduced impossible operating difficulties or else the catalyst was not satisfactory.

In accordance with the present invention, a method has now been developed whereby it is possible to reduce the acid added to the alkaline silica hydrogel slurry and to eliminate the ammonia addition prior to addition of the alum solution without introducing any operating difficulties and without impairing the catalyst quality. This new process results in a saving of raw materials, labor, and equipment, and, in addition, facilitates control of the process and yields a better product.

It is therefore an object of the present invention to provide a cheaper method of producing silica-alumina catalysts. Another object is to provide a simpler method of producing silica-alumina catalysts. Still another object is to provide a method of producing superior silica-alumina catalysts. Other objects and advantages of the present invention will be apparent to those skilled in the art from a study of the following detailed description.

In accordance with the present invention, a silica hydrogel is prepared by commingling an aqueous solution of an alkali metal silicate, which, for economic reasons, will usually be sodium silicate with a mineral acid such as sulfuric, or hydrochloric. Economic considerations dictate the use of sulfuric acid. The silicate and acid are brought together in a mixing nozzle and the mixture is discharged into a tank for aging. The amount of silicate and acid are carefully adjusted so that the pH of the resulting mixture is maintained between about 9.5 and 10.5. If the pH of the mixture at this stage is not maintained above about 9.5, setting occurs too rapidly and the resulting hydrogel is too firm to permit satisfactory working in the subsequent steps. At the other end of this range, setting is too slow. The hydrogel is aged for a short period, e. g. 10 to 20 minutes, and is then commingled with additional acid to reduce the pH to a value between 6.0 and 8.0, preferably between 6.6 and 7.3. The hydrogel is preferably added to the acid although the reverse order may be used. After another short aging period, the silica hydrogel slurry is then commingled with an amount of aluminum sulfate solution sufficient to yield the desired alumina to silica ratio in the finished catalyst. It is desirable though not necessary that the alum solution contain a small amount, 1½% to 2½%, of sulfuric acid. This insures the absence of basic aluminum sulfate in the aluminum sulfate solution and thereby minimizes the formation of complexes which result in an inordinately high sulfate content in the finished catalyst.

To the alum-silica hydrogel mixture is then added a sufficient quantity of a basic precipitant, preferably ammonia, to precipitate the alum as alumina. The resulting mixture is purified and further processed according to established methods, the usual procedure being to filter the mixture, following which it is washed and dried. If desired, the material may be dried prior to washing. The order of washing and drying may be chosen to fit circumstances and does not constitute a part of the present invention.

It is to be understood that the present invention resides in the discovery that the universally employed step of adding ammonia to the silica hydrogel slurry prior to the alum addition can be satisfactorily eliminated by closely controlling, within the specified limits, the pH of the mixtures prepared prior to that step. Elimination of this step results in an obvious saving in reactants, manpower and equipment as well as a reduction in the time required to make the catalyst and an improvement in certain properties of the catalyst without impairment of its other properties.

A preferred embodiment of the present invention is illustrated by the following illustrative but non-limiting example.

EXAMPLE I 5850 pounds of 40° Bé. sodium silicate containing 28.9% $SiO_2$ and 8.75% $Na_2O$ was diluted with water to a silica content of 4.43% and was continuously mixed with a sufficient amount of 40% sulfuric acid to effect gelation in about 4 minutes. The total amount of acid required was approximately 1355 pounds, and the pH of the mixture after aging for about 15 minutes was 10.0.

The aged mixture was then batched with 538 pounds of 40% sulfuric acid, the mixture being thoroughly agitated during the addition. The mixture, which had a pH of 6.9, was aged for about 15 minutes after which it was mixed with approximately 4606 pounds of an 18.4% alum solution containing 2.0% sulfuric acid. This mixture, approximately 44,671 pounds, was then co-mixed with approximately 999 pounds of 30% ammonia, which precipitated the alumina and raised the pH of the mix to 7.1.

The ammoniated mixture was then filtered, re-slurried with water, spray dried to produce microspheroidal particles, washed to remove the sodium and sulfate ions and finally dried.

Activity tests on the thus produced catalyst revealed that it was the equivalent, in all respects, to material produced by conventional methods.

The economic advantages of the present invention over the commercially used processes are indicated by the following material balance showing the amounts of the material used in each step for the present process as compared with the competitive commercial process indicating saving in material in preparing a 1950 pound batch of 87–13 silica-alumina catalyst.

*Table I*

| Step Number | Conventional Process | | | | | Total | Material Saving, Pounds |
|---|---|---|---|---|---|---|---|
| | 1 | 2 | 3 | 4 | 5 | | |
| 40° Bé. Sod. Sil | 5,850 | 0 | 0 | 0 | 0 | 5,850 | -------- |
| 60° Bé. H₂SO₄ | 685 | 403 | 0 | 1,058 | 0 | 2,146 | -------- |
| 30% NH₃ | 0 | 0 | 70 | 0 | 1,100 | 1,170 | -------- |
| Alum (as hydrate) | 0 | 0 | 0 | 387 | 0 | 387 | -------- |
| pH | 10.1 | 2.6 | 6.5 | -------- | 7.0 | -------- | -------- |

| Step Number | Present Invention | | | | | Total | Material Saving, Pounds |
|---|---|---|---|---|---|---|---|
| | 1 | 2 | 3 | 4 | 5 | | |
| 40° Bé. Sod. Sil | 5,850 | 0 | -------- | 0 | 0 | 5,850 | -------- |
| 60° Bé. H₂SO₄ | 685 | 271 | -------- | 1,058 | 0 | 2,014 | 132 |
| 30% NH₃ | 0 | 0 | -------- | 0 | 999 | 999 | 171 |
| Alum (as hydrate) | 0 | 0 | -------- | 387 | 0 | 387 | -------- |
| pH | 10.1 | 6.9 | -------- | -------- | 7.0 | -------- | -------- |

A consideration of the criteria for measuring the value of a catalyst indicates that in the field of catalytic hydrocarbon cracking, it is considered that a high catalyst surface area is desirable and there is some tendency to use the surface area, in addition to the $D+L$ (distillation plus loss) activity as a criterion of catalytic ability. Large average pore diameter is desirable since large pores are associated with a reduced tendency to become fouled by unregenerated carbon and/or metal contaminants, and a greater ease of gas diffusion during both cracking and regeneration. Since average pore diameter is calculated from basic measurements which determine surface area and pore diameter, and since high surface area and large pore diameters have been indicated as being desirable, it is apparent that a high pore volume is likewise desirable. Based on these criteria, catalysts prepared in accordance with the present invention are superior in some respects and in no respects inferior to catalysts prepared by the conventional methods wherein the pH of the hydrogel slurry is sharply reduced and is then brought back to the neutral by adding a basic reagent.

Thus, it is seen that the present invention provides a method whereby a universally used step in a process is eliminated and the product is, at the same time, improved.

It is now obvious from the foregoing disclosure that the novel method of the present invention provides a process which is shortened from a standpoint of time, requires less raw material, less equipment, and, obviously, produces the catalyst at a lower cost.

In addition to the cost advantage resulting from the above described economies, certain operating advantages are gained. For example, the silica-alumina composite is easily dewatered on the primary filters. This is the stage at which operating difficulties are often introduced into the process by slight changes in procedure. This means a reduction in the gas consumption for drying the finished product. In addition, the slurries are easily pumped and there is no difficulty with lump formation. In addition, these materials have excellent washing properties so that removal of the undesirable sodium and sulfate ions can be easily removed.

Silica-alumina material prepared in accordance with the present invention has been determined to have excellent pelleting properties so that it can be formed into shapes as desired. Furthermore, these shaped particles have been used, with excellent results, as carriers for other active materials, such as platinum for reforming catalysts, etc.

The catalysts prepared in accordance with the present invention have been used extensively in large scale units for the catalytic cracking of hydrocarbons and have proven to be entirely satisfactory.

It is to be understood that the present invention resides in the method of making the silica-alumina composite and that reference to the purification of this composite is given by way of illustration and not limitation. Thus, the composites may be formed into shapes, microspheres, or may be ground, or otherwise treated to produce silica-alumina material in any desired state of subdivision.

I claim:

1. A process for producing a silica-alumina hydrocarbon cracking catalyst comprising the steps of commingling sulfuric acid with sodium silicate solution to form a silica hydrogel in aqueous slurry at a pH of between 9.5 and 10.5, aging said hydrogel in said slurry, commingling the resulting hydrogel slurry with an additional quantity of sulfuric acid to reduce the pH to about 7.0, commingling therewith an amount of aluminum sulfate solution sufficient to produce the final product having the desired alumina to silica ratio, said alum solution containing about 1½% to 2½% of sulfuric acid, adding to the resulting mixture sufficient ammonia to precipitate the alumina and filtering, washing, and drying the resulting product.

2. A process for producing a silica-alumina hydrocarbon cracking catalyst comprising the steps of forming an alkaline silica hydrogel in aqueous slurry by mixing an aqueous solution of an alkali metal silicate with a sufficient quantity of mineral acid to yield a hydrogel at a pH of about 9.5 to 10.5, aging said hydrogel in said slurry for about 10 to 20 minutes, adding the resulting hydrogel to an additional quantity of mineral acid to reduce the pH to about 6.0 to 8.0, adding to the resulting mixture a sufficient quantity of acidified alum solution to yield a silica-alumina product having the desired alumina to silica ratio, adding thereto a sufficient quantity of a basic precipitant to precipitate alumina, filtering the resulting silica-alumina composite, washing said material to remove soluble constituents and drying the washed material.

3. A process for producing a silica-alumina hydrocarbon cracking catalyst comprising the steps of forming an alkaline silica hydrogel in aqueous slurry by co-mixing a solution of an alkali metal silicate with sufficient mineral acid to effect gelation in a period of about 5 minutes, aging said hydrogel in said slurry, co-mixing said slurry with an additional quantity of said mineral acid to reduce pH of said slurry to a value between about 6.6 and 7.3, co-mixing therewith sufficient alum solution to yield a silica-alumina product having an alumina-silica ratio of about 13–87, commingling therewith a sufficient quantity of a volatile basic precipitant to precipitate the alumina, and filtering, washing and drying the resulting silica-alumina composite.

4. A process for producing a silica-alumina hydrocarbon cracking catalyst comprising the steps of commingling sodium silicate solution with sulfuric acid in such quantities and at such concentrations to produce a silica hydrogel in aqueous slurry having a gelation time of about 5 minutes and a final pH of about 10.0, aging said hydrogel in said slurry, commingling therewith additional sulfuric acid to reduce the pH to a value of approximately 7.0, commingling with the resulting mixture a sufficient quantity of aluminum sulfate to give the desired final alumina content, said solution containing about 2% of sulfuric acid, adding thereto a sufficient quantity of aqueous ammonia to precipitate the alumina, and purifying and drying the resulting composite.

5. A process for producing a silica-alumina hydrocarbon cracking catalyst comprising the steps of mixing a sodium silicate solution with sufficient mineral acid to form a silica hydrogel in aqueous slurry at a pH of 9.5 to 10.5, aging said hydrogel in said slurry, adding thereto sufficient mineral acid to reduce the pH to about 6.0 to 8.0, commingling therewith a quantity of alum solution to provide the desired silica to alumina ratio in the final catalyst, said alum solution containing about 1.5 to 2.5% of free sulfuric acid, adding thereto sufficient ammonia to raise the pH of the mixture to about 7 and precipitate the alumina, and washing and drying the resulting composite.

6. A process for preparing a silica-alumina hydrocarbon cracking catalyst comprising reacting sodium silicate solution with sulfuric acid in sufficient quantities and concentrations to form a silica hydrogel in aqueous slurry at a pH of about 10, aging the slurried hydrogel for a period of about 10 to 20 minutes, commingling therewith additional sulfuric acid to reduce the pH thereof to about 7, adding thereto alum solution containing about 1.5 to 2.5% of free sulfuric acid in amount sufficient to provide the desired silica to alumina ratio in the final catalyst and thereby lower the pH, commingling with the resulting mixture sufficient ammonia to raise the pH to about 7 and precipitate the alumina, and washing and drying the resulting composite.

References Cited in the file of this patent

UNITED STATES PATENTS 2,462,236     Thomas _____ Feb. 22, 1949